G. S. CRAWFORD.
PUNCTURE PROOF GUARD FOR PNEUMATIC TIRES.
APPLICATION FILED MAR. 17, 1910.
978,274.
Patented Dec. 13, 1910.
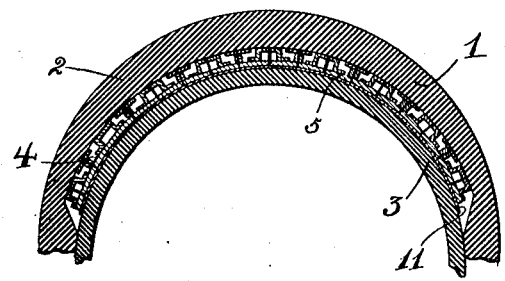
Fig. 1.
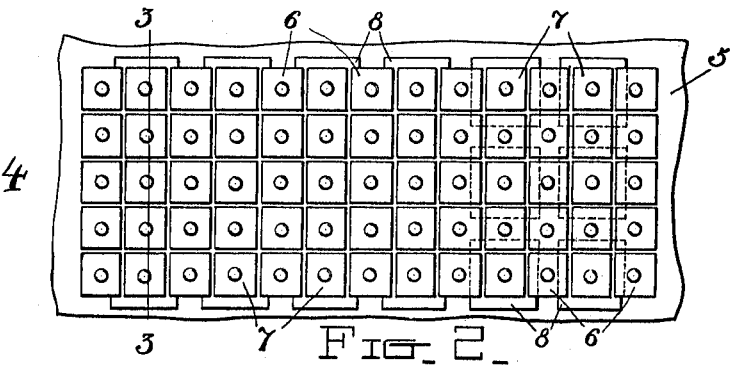
Fig. 2.
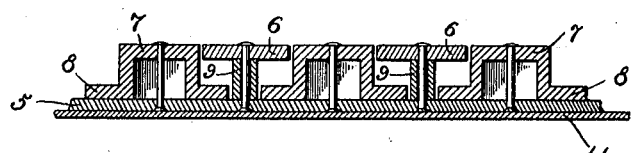
Fig. 3.
Fig. 4.
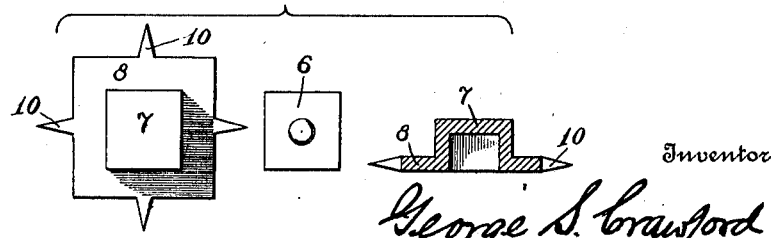
Witnesses
J. Milton Jester
Frank S. Brereton
Inventor
George S. Crawford
By F. F. Johnson
Attorney

UNITED STATES PATENT OFFICE.

GEORGE S. CRAWFORD, OF McKEESPORT, PENNSYLVANIA, ASSIGNOR OF ONE-HALF TO ROY R. REED, OF McKEESPORT, PENNSYLVANIA.

PUNCTURE-PROOF GUARD FOR PNEUMATIC TIRES.

978,274.

Specification of Letters Patent.

Patented Dec. 13, 1910.

Application filed March 17, 1910. Serial No. 549,984.

*To all whom it may concern:*

Be it known that I, GEORGE S. CRAWFORD, a citizen of the United States, residing at McKeesport, in the county of Allegheny and State of Pennsylvania, have invented certain new and useful Improvements in Puncture-Proof Guards for Pneumatic Tires, of which the following is a specification.

This invention relates to improvements in pneumatic tires, and has for its object the provision of a puncture proof guard adapted to be placed in the tire between the tread portion thereof and the inner or pneumatic tube, and consists essentially of a strip of suitable material faced or protected on one surface by a series of protecting guard plates secured thereto by suitable means, said plates consisting primarily of alternatingly arranged flat and struck-up, or inverted dish-shaped, guards, so arranged as to avoid frictional contact and yet completely protect every portion of the supporting surface of the strip, and yet permit said supporting strip to adapt itself, at all times, to the various flections of the tires during the revolution of the wheel.

To this end the invention consists in the novel construction and arrangement, and combination of the several parts of the device as hereinafter described, illustrated in the drawing and more particularly pointed out in the claims.

In the drawing: Figure 1 is a cross-sectional view of a pneumatic tire, broken away, showing the application of my improved puncture proof guard thereto. Fig. 2 is a top view of my improved puncture proof guard constructed according to my invention, and ready for application to the tire. Fig. 3 is a vertical cross-sectional view thereof taken on the line *a—a* showing the construction of the guard plates and their relative arrangement and one means of securing the same to the guard strip, and Fig. 4 are detailed views of the guard plates.

Referring to the drawing, the numeral 1 indicates the outer tube of a pneumatic tire, and 2 the tread portion thereof.

The numeral 3 indicates the inner tube, and 4 my improved puncture proof guard set within the tire between the two tubes, as shown, the guard plates lying against the inner side of the outer tube adjacent to the tread thereof.

My improved guard 4 consists of a suitable strip 5 of pliant material, such for instance, as canvas, vulcanized rubber, rawhide, etc., of sufficient length to encircle the inner tube 3 of the tire, and preferably, of a width of about, or a little less than, the diameter of the inner tube designed to be protected, and the guards 6 and 7, of a suitable material arranged thereon as shown, and secured thereto in any suitable manner. The guard 6 is preferably T-shape, being composed of a flat square top and a vertical washer 9, while the guard 7 is preferably square or box shape and is struck up to the shape shown, and is provided with a flange 8 which forms a base upon which said guard plates rest when in position. While these guard plates are shown as square, and are by preference square, it is evident that they may be of other shapes, such for instance, as triangular, pentagonal, hexagonal, etc., and still fully guard and protect the supporting strip 5 as is evident, and I therefore, do not wish to be understood as limiting myself to the shape shown in the drawing, nor to constructing such guards from any particular material, as they may be made from metal, fiber, raw-hide, etc., and answer all the purposes for which they are designed.

In making up my improved puncture proof guard, the guard plates 7 are placed on the strip 5 in parallel rows with their flanges 8 resting on said strip and sufficiently spaced apart to permit the flat plates 6 to fit snugly between the struck-up portions thereof, and are secured in position by suitable means. Suitable washers 9 are then set between the ends of the flanges 8 of the guard plates 7, and the guard plates 6 placed thereon, and both said plates and washers are then secured to said strip by rivets, or by any other suitable means. The thickness of the washers 9 are such that the top surfaces of the guard plates 6 will be in the same plane with the top surfaces of the guard plates 7, as shown, and that the guard plates 6 will be held above and away from the flanges 8 of the guard plates 7, as is apparent.

It will be evident from this construction of the puncture proof guard, that the top edges of the guard plates 6 and 7, when the strip is placed upon a flat surface, will rest easily against each other, but when placed within a tire, there then being both a longitudinal and a lateral curve, there will be a slight distance between the top edges of each guard plate and, therefore, there will be no friction between the plates, and the generation of heat will not occur, and, consequently, no "burning" or other damage will be done to adjacent rubber or other material forming the outer tube.

Instead of the guard plates 7 being secured to the strip by means of rivets, tangs 10 may be formed on the flanges 8 of the guard plate and secured in the strip as is evident. To prevent the ends of the rivets or tangs injuring the inner tube, I secure a strip 11 of canvas or other suitable material, to the under side of the strip, as is apparent. It is evident that this puncture proof guard if desired, may be set into the inner face of the outer tube, by forming in said tube a suitable recess, in which event the space for the inner tube will be greater.

Having thus described my invention, what I claim is:

1. As a new article of manufacture, a puncture-proof guard for pneumatic tires, comprising a strip of suitable material having arranged thereon alternate rows of inverted, flanged guard-plates and T-shape guard-plates the horizontal portion of the T-shape plates overlapping the flanged portion of the inverted plates.

2. As a new article of manufacture, a puncture-proof guard for pneumatic tires, comprising a strip of suitable material having arranged thereon alternate rows of inverted, flanged guard-plates and T-shape guard-plates, said guard-plates being fastened to said strips by suitable securing means, the horizontal portion of the T-shape plates overlapping the flanged portion of the inverted plates.

3. In a pneumatic-tire, the combination with the inner and outer tubes, of an interposed pucture-proof guard comprising a strip of suitable material having secured thereon alternate rows of inverted, flanged guard-plates and T-shape guard-plates, the horizontal portion of the T-shape plates overlapping the flanged portion of the inverted plates.

In testimony whereof I affix my signature, in presence of two witnesses.

GEORGE S. CRAWFORD.

Witnesses:
R. R. REED,
HYLAND C. KIRK.